United States Patent [19]

Kamohara et al.

[11] Patent Number: 5,631,320
[45] Date of Patent: May 20, 1997

[54] SOFT LINING MATERIAL COMPOSITION FOR DENTURES

[75] Inventors: Hiroshi Kamohara; Shunichi Futami, both of Tokyo; Masayuki Ikeno; Hideki Sugahara, both of Matsuida-machi, all of Japan

[73] Assignees: GC Corporation; Shin-Etsu Chemical Co., Ltd., both of Tokyo, Japan

[21] Appl. No.: 629,225

[22] Filed: Apr. 8, 1996

[30] Foreign Application Priority Data

Apr. 17, 1995 [JP] Japan ................... 7-114136

[51] Int. Cl.$^6$ ................... C08K 3/02
[52] U.S. Cl. ................... 524/789; 524/493; 524/494; 524/588
[58] Field of Search ................... 524/493, 494, 524/789, 588

[56] References Cited

U.S. PATENT DOCUMENTS

| | | |
|---|---|---|
| 4,235,633 | 11/1980 | Tomioka et al. . |
| 4,543,372 | 9/1985 | Watanabe et al. . |
| 4,550,030 | 10/1985 | Ohi et al. . |
| 4,604,142 | 8/1986 | Kamohara et al. . |
| 4,740,245 | 4/1988 | Futami et al. . |
| 4,773,933 | 9/1988 | Futami et al. . |
| 4,778,832 | 10/1988 | Futami et al. . |
| 4,909,847 | 3/1990 | Ohi et al. . |
| 4,911,759 | 3/1990 | Ohi et al. . |
| 4,970,245 | 11/1990 | Futami et al. . |
| 5,051,130 | 9/1991 | Futami et al. . |
| 5,051,476 | 9/1991 | Uji et al. . |
| 5,106,301 | 4/1992 | Miyahara et al. . |
| 5,116,222 | 5/1992 | Futami et al. . |
| 5,203,914 | 4/1993 | Futami et al. . |
| 5,349,037 | 9/1994 | Fujiki et al. ................... 528/15 |
| 5,417,966 | 5/1995 | Futami . |

*Primary Examiner*—Melvyn I. Marquis
*Attorney, Agent, or Firm*—Oblon, Spivak, McClelland, Maier & Neustadt, P.C.

[57] ABSTRACT

The present invention relates to a soft lining material composition for dentures, which comprises, at specific ratios, an organopolysiloxane having a specific structure and a viscosity lying in a specific range, an organohydrogenpolysiloxane having another specific structure, a platinum compound soluble in silicone, a finely divided silica having a BET specific surface area lying in a specific range and subjected to a hydrophobic treatment on the surface, and a molten quartz powder having an average particle size lying in a specific range, such soft lining material composition providing a cured soft lining material composition which undergoes a little hardness change upon inserted in the mouth over an extended period of time, does not separate away from a denture, and being satisfactory in terms of the ability to be cut and polished.

2 Claims, No Drawings

SOFT LINING MATERIAL COMPOSITION FOR DENTURES

BACKGROUND OF THE INVENTION

The present invention relates generally to a soft lining material for the mucosal-side surfaces of resin or metal dentures, and more particularly to a soft lining material composition for dentures, which is used for the purpose of relieving those who have dentures of pain and improving the suction of dentures.

Those who have dentures over an extended period of time often suffer from the adsorption of bones and the thinning of mucosae. In such cases, the dentures, because of being formed of resin and hard material such as metal, abut on the surrounding portion of the highest site of the bone during mastication, causing pain to the patients. With a periostitic patient, the alveolar bone processes are found or the alveolar bones are adsorbed to lower the alveolar ridges. In such cases, a undue pressure is applied on the site of the alveolar bone process during mastication, causing pain.

In serious cases caused by problems ascribable to mucosae and bones, there is no choice but to continuously use soft lining materials, except the cases where dentures are fixed with implants.

Currently available such soft lining materials are based on acrylic resins, fluorocarbon resins, polyolefin resins, and silicone resins. However, the acrylic resin type of soft lining shows good adhesion to dentures, but it cannot be used over an extended period of time because its elasticity vanishes rapidly within several weeks due to the oozing-out of plasticizers, etc. The fluorocarbon resin type of soft lining material is limited in terms of water absorption and oozing-out. However, this is not only less effective for relieving pain but also has difficulty in use because of involving awkward dental operations. The polyolefin resin type of soft lining material, albeit being excellent in elasticity, has difficulty in use because of involving very awkward dental operations through which polymerization by heating is carried out with the use of two adhesive materials. The silicone resin type of soft lining material can be used directly in the mouth and so can be handled with ease. A typical silicone resin type of soft lining material disclosed in Japanese Laid-Open Patent No. 7-41411 is characterized by the incorporation of a polyorganosylsesquioxane filler, and is excellent in resistance to coloration and the ability to be cut. However, problems with these silicone resin type of soft lining materials are that, while used in the mouth over an extended period of time, they become brittle with a visco-elasticity drop, and so lose their action on relieving pain. Further, they have a little adhesive strength with respect to a denture, and so often separate away from the denture. Furthermore, they are poor in the ability to be cut and polished, and become often unfit for dentures due to difficulty in post-curing correction of morphology.

Thus, currently available soft lining materials tend to become brittle with a viscoelasticity drop while they are used over an extended period of time, and so lose their initial effect on relieving pain. For this reason, they are still less than satisfactory for those who suffer from pain caused by such changes as mentioned above. Many of the current soft lining materials take long to produce because of involving awkward dental operations such as polymerization-by-heating operations. Further, they are poor in the ability to be cut and polished, and become unfit for dentures because of difficulty in post-curing correction of morphology. Furthermore, such problems may be solved by cost-intensive materials. However, they are practically unacceptable; it is one necessary requirement that they can be produced at relatively low cost.

A primary object of the present invention is to provide a soft lining material composition for dentures, which is substantially free from the problems such conventional soft lining materials have involved.

SUMMARY OF THE INVENTION

According to the present invention, the above-mentioned object is achieved by the provision of a soft lining material composition for dentures, which comprises:

(A) 100 parts by weight of an organopolysiloxane represented by the following average compositional formula (1):

$$(R^1)_a(R^2)_b SiO_{(4-a-b)/2} \quad (1)$$

where $R^1$ is an alkenyl group, $R^2$ is a substituted or unsubstituted monovalent hydrocarbon group, and $0<a<3$ and $0<b<3$ provided that $0<a+b<4$, and having a viscosity of 1,000 to 20,000 cps at 25° C., (B) 0.1 to 30 parts by weight of an organopolysiloxane represented by the following average compositional formula (2):

$$(H)_c(R^3)_d SiO_{(4-c-d)/2} \quad (2)$$

where $R^3$ is a substituted or unsubstituted monovalent hydrocarbon group having 1 to 10 carbon atoms, and $0<c\leq 2$ and $0<d\leq 3$ provided that $0<c+d<4$, (C) 10 to 500 ppm, based on the total amount of A+B, of a platinum compound soluble in silicone, (D) 5 to 50 parts by weight of a finely divided silica having a BET specific surface area of 50 to 500 m²/g and subjected to a hydrophobic treatment on the surface, and (E) 10 to 200 parts by weight of a molten quartz powder having an average particle size of 0.5 to 10 μm.

The present inventors have made intensive studies of a soft lining material composition for dentures, which is less variable in terms of viscoelasticity upon used in the mouth over an extended period of time, excels in the ability to be cut and polished, and dispenses with awkward dental operations such as polymerization-by-heating operations, and have now found a novel soft lining material composition for dentures, which is improved in terms of adhesion to dentures by containing the organopolysiloxane component (A), the organohydrogenpolysiloxane component (B) which is a crosslinking agent used with an ordinary addition-curing type of silicone, the platinum compound component (C) soluble in silicone, which serves as catalyst, and the finely divided silica component (D) subjected to a hydrophobic treatment on the surface, thereby to enhance the adhesion between a denture and a soft lining material composition, and is allowed to have suitable hardness and viscoelasticity and improved in terms of the ability to be cut and polished by further containing the molten quartz powder component (E).

The organopolysiloxane component (A) used herein is represented by the following average compositional formula (1):

$$(R^1)_a(R^2)_b SiO_{(4-a-b)/2} \quad (1)$$

Here $R^1$ is an alkenyl group, and $R^2$ is a substituted or unsubstituted monovalent hydrocarbon group free from aliphatic unsaturated bonds. The following relations $0<a<3$, preferably $0.0001 \leq a<0.5$ and $0<b<3$, preferably $0.8 \leq b<2.3$ are satisfied on condition that $0<a+b<4$, preferably $0.8<a+b<2.4$ more preferably $0.001 \leq a<0.1$, $1.85 \leq b \leq 2.2$, $1.85<a+b<2.3$.

The alkenyl group represented by $R^1$ in formula (1), for instance, include aliphatic unsaturated hydrocarbon groups having 2 to 10, especially 2 to 4, carbon atoms such as vinyl, allyl, propenyl, isopropenyl, butenyl, isobutenyl, hexenyl, and cyclohexenyl groups, among which the vinyl group is most preferable. The hydrocarbon group represented by $R^2$ includes those having 1 to 12, especially 1 to 8, carbon atoms, and exemplified by alkyl groups such as methyl, ethyl, propyl, butyl, hexyl, cyclohexyl, octyl, and decyl groups, aryl groups such as phenyl, and tolyl groups, and aralkyl groups such as benzyl, and phenylethyl groups. Or hydrogen atoms of these organic groups may be wholly or partly substituted by halogen atoms or cyano group, as exemplified by chloromethyl, trifluoropropyl, and cyanoethyl groups. Particular preference, however, is given to methyl, phenyl, and trifluoropropyl groups. In formula (1), the substituents bonded to the silicon atom may be identical with or different from each other, but are required to have at least two aliphatic unsaturated hydrocarbon groups per molecule, especially on the silicon atom at both terminuses of the molecular chain. The organopolysiloxane used herein is generally a linear form of diorganopolysiloxane. However, it may contain a partially branched or ring skeleton or, in the alternative, it may be a three-dimensional network form of resinous material containing triorganosiloxy and $SiO_4/_2$ units. Given below are examples of the diorganopolysiloxane represented by formula (1), which may be synthesized according to known synthesis methods.

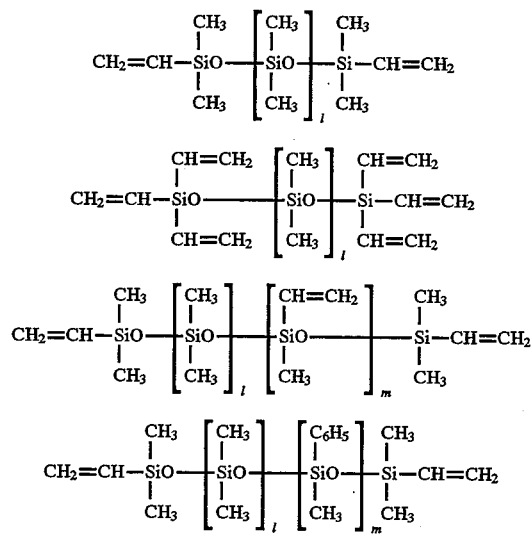

where small letters l and m are each a positive integer, and l+m satisfies the following viscosity range.

The organopolysiloxane has a viscosity of 1,000 to 20,000 cps as measured at 25° C. A composition containing the organopolysiloxane having a viscosity of less than 1,000 cps provides a cured soft lining material which is brittle and apt to be broken easily. Consequently, not only does the soft lining material break or otherwise cause inconvenience to the denture while it is in the mouth or when it is taken out of the mouth, but is also apt to tear up on the interface with the denture, with the result that the soft lining material separates away from the denture. A composition containing the organopolysiloxane having a viscosity of more than 20,000 cps is not preferable because not only is it poor in the ability to be cut and polished so that denture morphology cannot be corrected, but it is also increased in viscosity and so has difficulty in mixing. Preferably, the organopolysiloxane is in linear form that is hindered by vinyl diorganosilyl group at both terminuses of the molecular chain. However, two or more such terminal vinyl groups may be present or alternatively vinyl groups may be attached onto the silicon atom somewhere in the molecular chain, for instance, onto the silicon atom of diorgano-siloxane or monoorganosiloxane unit.

The organohydrogenpolysiloxane component (B) is a crosslinking agent for the organopolysiloxane component (A), and is preferably represented by the following average compositional formula (2):

Here $R^3$ is a substituted or unsubstituted monovalent hydrocarbon group having 1 to 10 carbon atoms. The relations $0<c\leq2$, preferably $0.005\leq c\leq1$, and $0<d\leq3$, preferably $0.8\leq d\leq2.5$ are satisfied on condition that $0<c+d<4$, preferably $0.8<c+d\leq3$, more preferably $0.01\leq c\leq1$, $0.8\leq d\leq2.5$, $1\leq c+d\leq2.4$.

In formula (2), $R^3$ may be the same as mentioned for $R^1$ and $R^2$. Preference, however, is given to hydrocarbon groups free from aliphatic unsaturated bonds such as $R^2$, and having 1 to 8, especially 1 to 4, carbon atoms, for instance, alkyl groups such as methyl, ethyl, propyl, butyl, hexyl and cyclohexyl groups, aryl groups such as phenyl, and tolyl groups, and aralkyl groups such as benzyl, and phenylethyl groups. Hydrogen atoms of these organic groups may be wholly or partly substituted by halogen atoms or cyano group, as exemplified by chloromethyl, trifluoropropyl, and cyanoethyl groups. One or more of such organic groups may be used. The organohydrogenpolysiloxane contains at least two, preferably at least three or more hydrogen atoms attached to the silicon atom or SiH groups which may be present at the terminuses of the molecular chain and/or somewhere in the molecular chain. It is here to be understood that the structure of the organohydrogenpolysiloxane is generally in linear form which may contain a partially branched or ring skeleton or, in the alternative, it may be a three-dimensional network form of resinous material containing hydrodiorganosiloxane units and/or hydrotriorganosiloxane units, and $SiO_4/_2$ units. Usually, the organohydrogenpolysiloxane used herein has a viscosity of 0.1 to 1,000 cps, preferably about 0.5 to 500 cps as measured at 25° C. Given below are examples of the organohydrogenpolysiloxane represented by formula (2), which may be synthesized according to known synthesis methods.

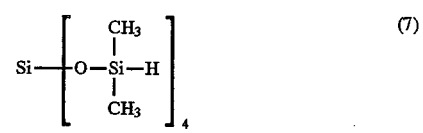

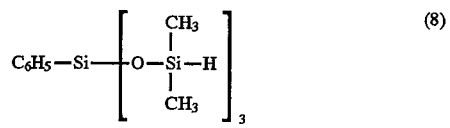

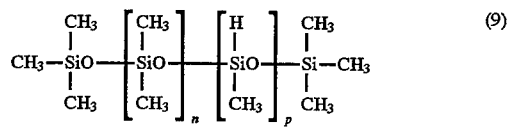

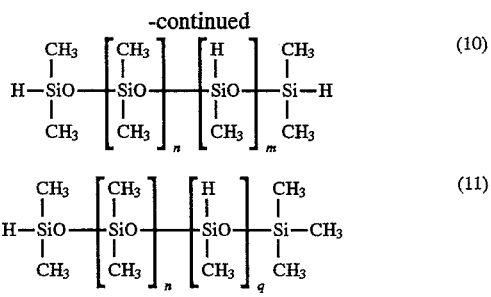

Here small letters m, n, p and q are integers, and m≧0, n≧0, p≧2, and q≧1, and m+n, n+p, and n+q satisfy the above-mentioned viscosity range of 0.1 to 1,000 cps, preferably about 0.5 to 500 cps.

This organohydrogenpolysiloxane component (B), when used at an amount of less than 0.1 part by weight relative to 100 parts by weight of the component (A), provides a cured soft lining material of low hardness, and makes the curing rate of the composition slow as well. The component (B), when used at an amount of more than 30 parts by weight, provides a very brittle cured soft lining material.

Alternatively, the organohydrogenpolysiloxane component (B) may be incorporated in the composition such that the amount of SiH groups or hydrogen atoms attached to the silicon atom in the component (B) with respect to the aliphatic unsaturated groups attached to the silicon atom in the component (A) lies in the range of 0.5 to 5, especially about 0.8 to 3 in molar ratio.

For the component (C) that is the platinum compound soluble in silicone, known addition reaction catalysts are used. For instance, platinic acid chloride, alcohol-modified platinic acid chloride, and platinic acid chloride-olefin complexes may be used. Particular preference, however, is given to a vinylsiloxane complex of platinic acid chloride. The amount of the component (C) used herein lies in the range of 10 to 500 ppm relative to the total amount of (A) and (B). A composition containing the component (C) at an amount of less than 10 ppm has a curing rate too low for diagnosis and treatment purposes taking a longer time, and so is practically unacceptable. A composition containing the component (C) at an amount of more than 500 ppm provides a soft lining material that is unfit for dentures, because its curing speed is too high for sufficient muscle trimming upon inserted in the mouth. Preferably, the platinum compound soluble in silicone such as platinic acid chloride is dissolved in solvents for use, for instance, alcoholic, ketone, ether, or hydrocarbon solvents, or silicone oil.

The finely divided silica component (D) has a BET specific surface area of 50 to 500 m²/g, and is subjected to a hydrophobic treatment on the surface. Essentially, this hydrophobic silica may be known hydrophobic silica with all or most of its surface active silanol groups hindered or blocked by hydrophobic groups of $(CH_3)_3SiO_{1/2}$ units, $(CH_3)_2SiO_{2/2}$ units, $CH_3SiO_{3/2}$ units, etc. which is obtained by heat-treating hydrophilic silica, e.g., fumed silica, using a surface treatment agent (with or without water), for instance, methyltrichlorosilane, dimethyldichlorosilane, or trimethylchlorosilane, or equivalents thereof, e.g., alkoxysilane, octamethylcyclotetrasiloxane, hexamethyldisiloxane or hexamethyldisilazane, which may be used alone or in admixture. The finely divided hydrophobic silica is effective to enhance the adhesion between a denture and a soft lining material composition, and to increase the tearing strength of a soft lining material composition so that any separation of the soft lining material composition away from the denture can be avoided in the mouth over an extended period of time. The finely divided hydrophobic silica should have a BET specific surface area of 50 to 500 m²/g. At a BET specific surface area of less than 50 m²/g no considerable improvement in the adhesion is achieved. Besides, the resulting soft lining material is apt to separate away from a denture due to its insufficient tearing strength. At more than 500 m²/g the ability of the resulting soft lining material to be cut and polished drops. The amount of the finely divided hydrophobic silica used herein should lie in the range of 5 to 50 parts by weight relative to 100 parts by weight of the component (A). At less than 5 parts by weight the adhesion between the resulting soft lining material and a denture drops with a tearing strength drop, whereas at more than 50 parts by weight not only does the viscosity of the soft lining material become too high for mixing, but the ability of the resulting soft lining material to be cut and polished becomes worse as well.

The molten quartz powder component (E), when its average particle size lies in the range of 0.5 to 10 μm, can impart a suitable degree of hardness to the cured soft lining material composition without detriment to the ability thereof to be cut and polished, and add a proper degree of viscoelasticity to the cured soft lining material at which pain is well relieved. At an average particle size of less than 0.5 μm the ability of the cured soft lining material to be cut and polished becomes worse. At more than 10 μm, on the other hand, the mixture has a rough surface and so gives offense to a patient during muscle trimming in the mouth. Besides, the surface of the cured soft lining material is lacking in smoothness and, hence, an aesthetic feature. As compared with ordinary quartz powder, this molten quartz powder is smaller in the content of impurities so that it can provide a soft lining material composition of good transparency, and is lower in true specific gravity so that it can be filled in the mouth at a relatively high density. The amount of the molten quartz powder used herein should lie in the range of 10 to 200 parts by weight relative to 100 parts by weight of the component (A). When this molten quartz powder having an average particle size of 0.5 to 10 μm is used at an amount of less than 10 parts by weight per 100 parts by weight of the component (A), the cured soft lining material cannot have sufficient hardness. At more than 200 parts by weight, the hardness of the cured soft lining material becomes too high to take pain away from a patient. Besides, the soft lining material becomes too high in viscosity and so involves difficulty in mixing due to its large resistance to mixing.

Various inorganic or organic coloring materials such as red oxide and titanium yellow may be used with the composition of the present invention without detriment to the properties inherent therein.

By way of example alone but not by way of limitation, the present invention will now be explained more specifically with reference to some examples.

EXAMPLE 1

Base and catalyst pastes of the following compositions were prepared.

Base Paste

Dimethylpolysiloxane having a viscosity of 5,000 cps at 25° C. and end-blocked by dimethylvinylsiloxy group at both terminuses of the molecular chain, 100 parts by weight;

Straight-chain methylhydrogenpolysiloxane containing 40 mol % of methylhydrogensiloxane units, 3 parts by weight;

Molten quartz powder having an average particle size of 5 μm, 70 parts by weight.

Catalyst Paste

Dimethylpolysiloxane having a viscosity of 5,000 cps at 25° C. and end-blocked by dimethylvinylsiloxy group at both terminuses of the molecular chain, 100 parts by weight;

Silicone oil solution containing 0.4% by weight of 1,3-divinyltetramethyldisiloxane-platinum complex, 3 parts by weight;

Finely divided hydrophobic silica having a BET specific surface area of 100 $m^2/g$ and hindered by $(CH_3)_2SiO_{2/2}$ units on the surface, 30 parts by weight Then, equivalent amounts of the base and catalyst pastes were mixed together for 30 seconds using a spatula, and the mixture was tested as explained in the following (a) to (e). The results are set out in Table 1.

(a) Hardness Test

The mixture was poured in a mold of 24 mm in inside diameter and 8 mm in height, and the mold was then immersed in water of 37° C. with acryl plates located on top and bottom. After 30 minutes, the mixture was removed from the mold by pulling up from the water to determine the hardness using a spring type of hardness test machine Type A described in JIS K6301.

(b) Hardness Change by Immersion in Water

A sample prepared in the same manner as mentioned above was immersed in water of 37° C. for one month. Then, the sample was tested as mentioned above.

(c) Tearing Test

The mixture was poured in a B-type mold, which was then immersed in water of 37° C. according to JIS K6301. After 30 minutes, the mixture removed out of the mold by pulling up from the water was tested for tearing strength.

(d) Cutting & Polishing Test

A sample prepared as mentioned in conjunction with Hardness Test was cut and polished with a silicone point. The results are set out in Table 1 wherein symbols O, Δ and X represent samples equivalent, slight inferior, and remarkably inferior, to a comparative resin plate.

(e) Adhesion-to-Denture Test

A denture is of complicated shape and, for instance, has delicate asperities. A clinically acceptable denture was prepared, and then pressed against a model with the mixture built up thereon. The model was then immersed in water of 37° C. After 30 minutes, the denture removed from the model and was subjected to a thermal cycle test involving a 1-minute immersion in water of 4° C. and a 1-minute immersion in water of 60° C. to determine whether or not the soft lining material composition separated away from the denture.

EXAMPLE 2

Base and catalyst pastes of the following compositions were prepared.

Base Paste

Dimethylpolysiloxane having a viscosity of 15,000 cps at 25° C. and end-blocked by dimethylvinylsiloxy group at both terminuses of the molecular chain, 100 parts by weight;

Straight-chain methylhydrogenpolysiloxane containing 40 mol % of methylhydrogensiloxane units, 3 parts by weight;

Molten quartz powder having an average particle size of 7 μm; 150 parts by weight.

Catalyst Paste

Dimethylpolysiloxane having a viscosity of 15,000 cps at 25° C. and end-blocked by dimethylvinylsiloxy group at both terminuses of the molecular chain, 100 parts by weight;

Silicone oil solution containing 0.4% by weight of 1,3-divinyltetramethyldisiloxane-platinum complex, 3 parts by weight;

Finely divided hydrophobic silica having a BET specific surface area of 400 $m^2/g$ and hindered by $(CH_3)_2SiO_{2/2}$ units on the surface, 10 parts by weight.

Then, equivalent amounts of the base and catalyst pastes were mixed together for 30 seconds using a spatula, and the same tests as in Example 1 were done. The results are set out in Table 1.

EXAMPLE 3

Base and catalyst pastes of the following compositions were prepared.

Base Paste

Dimethylpolysiloxane having a viscosity of 1,000 cps at 25° C. and end-blocked by dimethylvinylsiloxy group at both terminuses of the molecular chain, 100 parts by weight;

Straight-chain methylhydrogenpolysiloxane containing 40 mol % of methylhydrogensiloxane, 3 parts by weight;

Molten quartz powder having an average particle size of 2 μm, 30 parts by weight.

Finely divided hydrophobic silica having a BET specific surface area of 200 $m^2/g$ and hindered by $(CH_3)_2SiO_{2/2}$ units on the surface, 10 parts by weight.

Catalyst Paste

Dimethylpolysiloxane having a viscosity of 1,000 cps at 25° C. and end-blocked by dimethylvinylsiloxy group at both terminuses of the molecular chain, 100 parts by weight;

Silicone oil solution containing 0.4% by weight of 1,3-divinyltetramethyldisiloxane-platinum complex, 3 parts by weight;

Finely divided hydrophobic silica having a BET specific surface area of 200 $m^2/g$ and hindered by $(CH_3)_2SiO_{2/2}$ units on the surface, 30 parts by weight.

Then, equivalent amounts of the base and catalyst pastes were mixed together for 30 seconds using a spatula, and the same tests as in Example 1 were done. The results are set out in Table 1.

COMPARATIVE EXAMPLE 1

Base and catalyst pastes of the following compositions were prepared.

Base Paste

Dimethylpolysiloxane having a viscosity of 5,000 cps at 25° C. and end-blocked by dimethylvinylsiloxy group at both terminuses of the molecular chain, 100 parts by weight;

Straight-chain methylhydrogenpolysiloxane containing 40 mol % of methylhydrogensiloxane units, 3 parts by weight;

Molten quartz powder having an average particle size of 50 μm, 300 parts by weight.

Catalyst Paste

Dimethylpolysiloxane having a viscosity of 50,000 cps at 25° C. and end-blocked by dimethylvinylsiloxy group at both terminuses of the molecular chain, 100 parts by weight;

Silicone oil solution containing 0.4% by weight of 1,3-divinyltetramethyldisiloxane-platinum complex, 3 parts by weight;

Molten quartz powder having an average particle size of 50 μm, 300 parts by weight.

Then, equivalent amounts of the base and catalyst pastes were mixed together for 30 seconds using a spatula, and the same tests as in Example 1 were done. The results are set out in Table 1.

TABLE 1

|  | Example 1 | Example 2 | Example 3 | Comparative Example 1 |
|---|---|---|---|---|
| Hardness | 48 | 36 | 40 | 70 |
| Hardness 1 month after immersion in water 37° C. | 50 | 38 | 42 | 78 |
| Tearing Strength (kgf/cm2) | 18 | 15 | 20 | 8 |
| Cutting & Polishing | ○ | ○ | ○ | X |
| Adhesion to denture | No separation of the soft lining material composition away from the denture | No separation of the soft lining material composition away from the denture | No separation of the soft lining material composition away from the denture | A peripheral edge of the soft lining material separated away from the denture |

The soft lining material composition according to Comparative Example 1 is free from any finely divided silica subjected to a hydrophobic treatment on the surface, and has an average particle size of the molten quartz powder contained therein is larger than that of the present invention, and contains dimethylpolysiloxane end-blocked by dimethylvinylsiloxygroup at both terminuses of the molecular chain, which is of high viscosity. In the comparative example, the cured soft lining material is poor in adhesion to the denture and is low in tearing strength, and a peripheral edge of the cured soft lining material separated away from the denture, as can be seen from Table 1. The cured soft lining material compositions according to Examples 1-3 are of sufficiently high tearing strength, and do not separate away from the dentures at all. The soft lining material according to the comparative example is of high hardness and increases in hardness by immersion in water of 37° C. Besides, the comparative soft lining material is not expected to have action on relieving pain, and is poor in the ability to be cut and polished as well. The soft lining material compositions according to Examples 1-3 undergo a slight increase in hardness even upon immersed in water of 37° C.—this indicates that the action on relieving pain can be maintained, and is satisfactory in terms of the ability to be cut and polished.

The soft lining material composition according to the present invention provides a cured soft lining material composition which undergoes no substantial hardness change over an extended period of time to ensure that the effect on relieving pain can be maintained, and which is high in terms of adhesion to a denture and tearing strength, so that it cannot separate away from the denture. Moreover, the cured soft lining material composition is satisfactory in terms of the ability to be cut and polished, and can be morphologically corrected so that it can be well fit for a denture. Thus, the present invention is the first to develop a novel soft soft lining material composition for dentures which has many advantages that could not so far be achieved in the conventional soft lining material composition.

What is claimed is:

1. A soft lining material composition for dentures, which comprises:

(A) 100 parts by weight of an organopolysiloxane represented by the following average compositional formula (1):

where $R^1$ is an alkenyl group, $R^2$ is a substituted or unsubstituted monovalent hydrocarbon group, a is a number as given by $0<a<3$, and b is a number as given by $0<b<3$, provided that $0<a+b<4$, and having a viscosity of 1,000 to 20,000 cps at 25° C., (B) 0.1 to 30 parts by weight of an organopolysiloxane represented by the following average compositional formula (2):

where $R^3$ is a substituted or unsubstituted monovalent hydrocarbon group having 1 to 10 carbon atoms, c is a number as given by $0<c\leq2$, and d is a number as given by $0<d\leq3$, provided that $0<c+d<4$, (C) 10 to 500 ppm, based on the total amount of A+B, of a platinum compound addition reaction catalyst soluble in silicone, (D) 5 to 50 parts by weight of a finely divided silica having a BET specific surface area of 50 to 500 m²/g and subjected to a hydrophobic treatment on the surface, and (E) 10 to 200 parts by weight of a molten quartz powder having an average particle size of 0.5 to 10 μm.

2. The soft lining material composition for dentures of claim 1, wherein the platinum compound addition reaction catalyst is selected from the group consisting of platinic acid chloride, alcohol-modified platinic acid chloride, platinic acid chloride-olefin complexes and a vinylsiloxane complex of platinic acid chloride.

* * * * *